Oct. 22, 1963  E. J. ZEITLIN  3,107,714
ANTI-SKID DEVICE
Filed Dec. 15, 1961
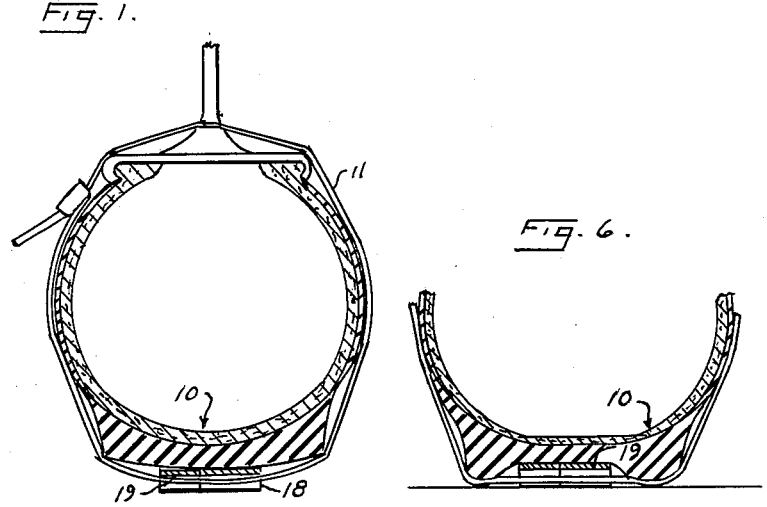
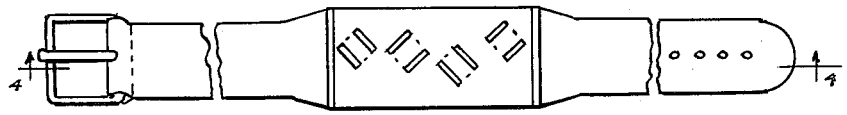
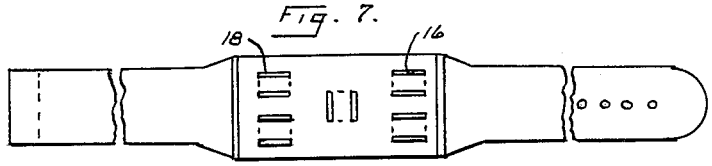
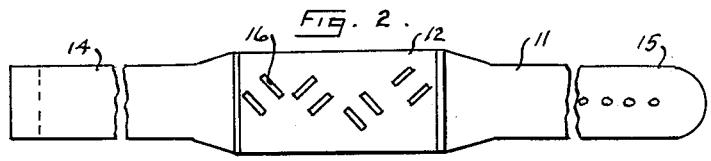
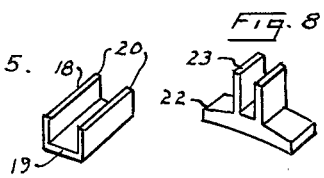
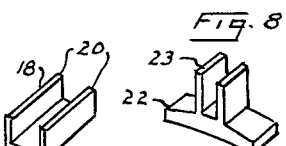
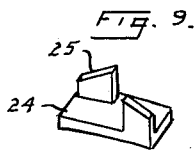
INVENTOR.
EDWARD J. ZEITLIN
BY Howard J. Jeandron
AGENT United States Patent Office 3,107,714
Patented Oct. 22, 1963

3,107,714
ANTI-SKID DEVICE
Edward J. Zeitlin, % Heat Timer Corp.,
657 Broadway, Purdy, N.Y.
Filed Dec. 15, 1961, Ser. No. 159,609
2 Claims. (Cl. 152—222)

This invention relates to a non-skid or anti-skid device for vehicle wheels and more particularly to a cross band or strap in which a plurality of non-skid elements are inserted and retained in juxta-position to the tread of the tire of the vehicle wheel.

It is an object of this invention to provide an adjustable strap for a motor vehicle tire in which a plurality of non-skid or anti-skid elements are mounted in juxta-position to the tread of the tire.

A further object of this invention is to provide an adjustable strap for a motor vehicle tire in which a plurality of non-skid or anti-skid elements are mounted in an angular relation to the central axis of the tire and the central axis of the strap and in juxta-position to the tread of the tire.

A still further object of this invention is to provide an adjustable strap for a motor vehicle tire in which a plurality of non-skid or anti-skid elements are mounted in alignment with the axis of the strap and in juxta-position to the tread of the tire.

A still further object of this invention is to provide an adjustable strap for a motor vehicle tire in which a plurality of non-skid or anti-skid elements are mounted in alignment with the central axis of the tire and in juxta-position to the tread of the tire.

A still further object of this invention is to provide an adjustable strap for a motor vehicle tire in which a plurality of U-shaped non-skid elements are mounted in juxta-position to the tread of the tire to protrude through the strap.

A still further object of this invention is to provide an adjustable strap for a motor vehicle tire in which a plurality of non-skid elements with a portion projecting through the strap are mounted in juxta-position to the tread of the tire.

Other objects of this invention shall be apparent by reference to the accompanying detailed description and the drawings in which FIG. 1 is a cross sectional view of a tire with the strap and non-skid elements, FIG. 2 is a plan view of the strap shown in FIG. 1, FIG. 3 is a plan view of the strap with the non-skid elements mounted, FIG. 4 is a cross sectional view taken on line 4—4 of FIG. 3, FIG. 5 is a perspective view of a non-skid element, FIG. 6 is a partial cross sectional view showing the strap and non-skid elements under load, FIG. 7 is a further embodiment of the strap and non-skid elements, FIG. 8 is a further embodiment of a non-skid element, and FIG. 9 is a still further embodiment of a non-skid element.

Referring to the drawings and particularly FIG. 1 there is illustrated a typical automotive tire 10 shown in cross section with a tire strap 11 of the type that surrounds the tire. The strap 11 may also be a chain or be provided for a different type on the particular wheels that do not provide apertures for the strap to surround. Referring to FIG. 2 the strap 11 is provided with a tread portion 12, a buckle portion 14 and a loose end or fastening portion 15. The tread portion is provided with a plurality of elongated apertures 16 positioned in pairs so that a plurality of non-skid elements may be quickly and easily inserted through the apertures 16 as illustrated in FIG. 3 in which the non-skid element 18 shown in FIG. 5 is positioned through the apertures 16 to extend through and beyond the surface of the strap as shown in FIG. 1. With this type of mounting the non-skid elements 18 are retained with the closed end 19 bearing against the tread of the tire and the open edges 20 protruding to abut with the surface of the road as shown in FIG. 6. It is to be noted that the elements 18 will move back and forth, that is, to the position illustrated in FIG. 6 under load and back to the position illustrated in FIG. 1 when they leave the loaded area. Thus the elements 18 will tend to continually clear the snow or ice that would normally adhere to the elements. It is also to be noted that the tire 10 must be soft enough to allow the movement of elements 18 as the tire rotates. Referring to FIG. 7 there is illustrated a further embodiment of this invention in which the elements 18 are mounted through slots 16 but the slots and elements are on a different axis. The elements may all be mounted parallel to the axis of the strap or some of the elements may be mounted parallel to the central axis of the tire.

Referring to FIG. 8 there is illustrated a further embodiment of the type of non-skid element that may be utilized. In this instance there is provided a wide base 22 that will abut with the tread of the tire. The projecting elements 23 are the same length and position as the U-shaped elements shown in FIGS. 1, 3, 6 and 7.

Referring to FIG. 9 there is illustrated a still further embodiment of the non-skid element 18 in which there is a base 24 that is positioned upon the tread of the tire and in which the projecting elements 25 may be in various planes, angular or in alignment with the strap and in this embodiment the projecting elements 25 may be provided with a sharp piercing edge or point. The strap of FIG. 2 will have its aperture 16 provided according to the projections 25 of the element 24.

Although the strap provided for supporting a plurality of non-skid or anti-skid elements is shown in one form, the strap may be of any of the well known forms to permit attaching it in the relation shown in FIG. 1 to support the non-skid or anti-skid elements adjacent the tread of the tire. And although the non-skid or anti-skid elements are shown in a U-shaped form, they may be provided in various forms as long as the projecting element is fitted through a slot in the strap and able to reciprocate in this slot during the rotation of the wheel. The outer edge of the projecting elements may be flat as shown in FIGS. 5 and 8 or may be provided with an angular or pointed edge as shown in FIG. 9. Also the non-skid or anti-skid elements may be easily replaceable in the strap or they may be mounted within the strap and their wearing edges spread so that the element will reciprocate within the slots in the fashion in which it is intended but the element cannot be snapped out of the strap and lost. Various changes may be made to the elements and the strap without departing from the spirit of this invention and this invention shall be limited only by the appended claims.

What is claimed is:

1. An anti-skid devices for use with a vehicle tire mounted on a wheel rim, including a band adapted to extend transversely across the tread of the tire, said band comprising a tread portion and strap portion that includes a buckle portion on one side and a fastening portion on the other side, said strap portions extending from said tread portion over the side walls of the tire, said tread portion having aperture formed in pairs through the same, metal members having a base portion and two legs of predetermined length and in which the base portion is held in place between said tread portion of said band and said tire, and the two legs of said metal member extending through said paired apertures and protruding from said tread portion of said band, said metal members moving back and forth in said band to come into and out of contact with the surface on which the tire bears.

2. In a device according to claim 1 in which the band extends across the tread of the tire and the buckle portion and fastening portion are formed as a chain.

References Cited in the file of this patent
UNITED STATES PATENTS

| | | |
|---|---|---|
| 2,533,151 | Stevens | Dec. 5, 1950 |
| 2,685,903 | Lutey | Aug. 10, 1954 |
| 2,720,239 | Mason | Oct. 11, 1955 |